United States Patent [19]

Londrigan

[11] Patent Number: 4,529,745

[45] Date of Patent: Jul. 16, 1985

[54] UNSATURATED POLYOXYALKYLENE ADDUCT/FUMARATE DIESTER REACTION PRODUCT FOR CELLULAR FOAM STABILIZATION

[75] Inventor: Michael E. Londrigan, Clearwater, Fla.

[73] Assignee: Jim Walker Resources, Inc., Birmingham, Ala.

[21] Appl. No.: 490,279

[22] Filed: May 2, 1983

[51] Int. Cl.³ .................. C08J 9/00; C08J 5/12
[52] U.S. Cl. .................. 521/137; 428/425.1; 428/425.6; 428/425.8; 560/198
[58] Field of Search ............ 521/137; 428/425.1, 428/425.8, 425.6

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,546,321 | 12/1970 | Jabloner et al. | 260/874 |
| 3,779,959 | 12/1973 | Pinten et al. | 260/2.5 |
| 3,914,188 | 10/1975 | Carroll et al. | 260/2.5 |
| 4,140,842 | 2/1979 | Beale et al. | 521/129 |
| 4,250,077 | 2/1981 | Von Bonin et al. | 260/37 N |
| 4,365,024 | 12/1982 | Frentzel | 521/114 |

FOREIGN PATENT DOCUMENTS 1040452  8/1966  United Kingdom .

*Primary Examiner*—Veronica P. Hoke
*Attorney, Agent, or Firm*—James W. Grace; Charled W. Vanecek

[57] ABSTRACT

Polyoxyalkylene surfactants for cellular foams can be prepared by reacting under free radical polymerization conditions (1) an unsaturated polyoxyalkylene adduct and (2) an esterified unsaturated dibasic acid ingredient, wherein unsaturated diester ingredient (2) either completely or partially comprises a fumarate diester.

19 Claims, 3 Drawing Figures

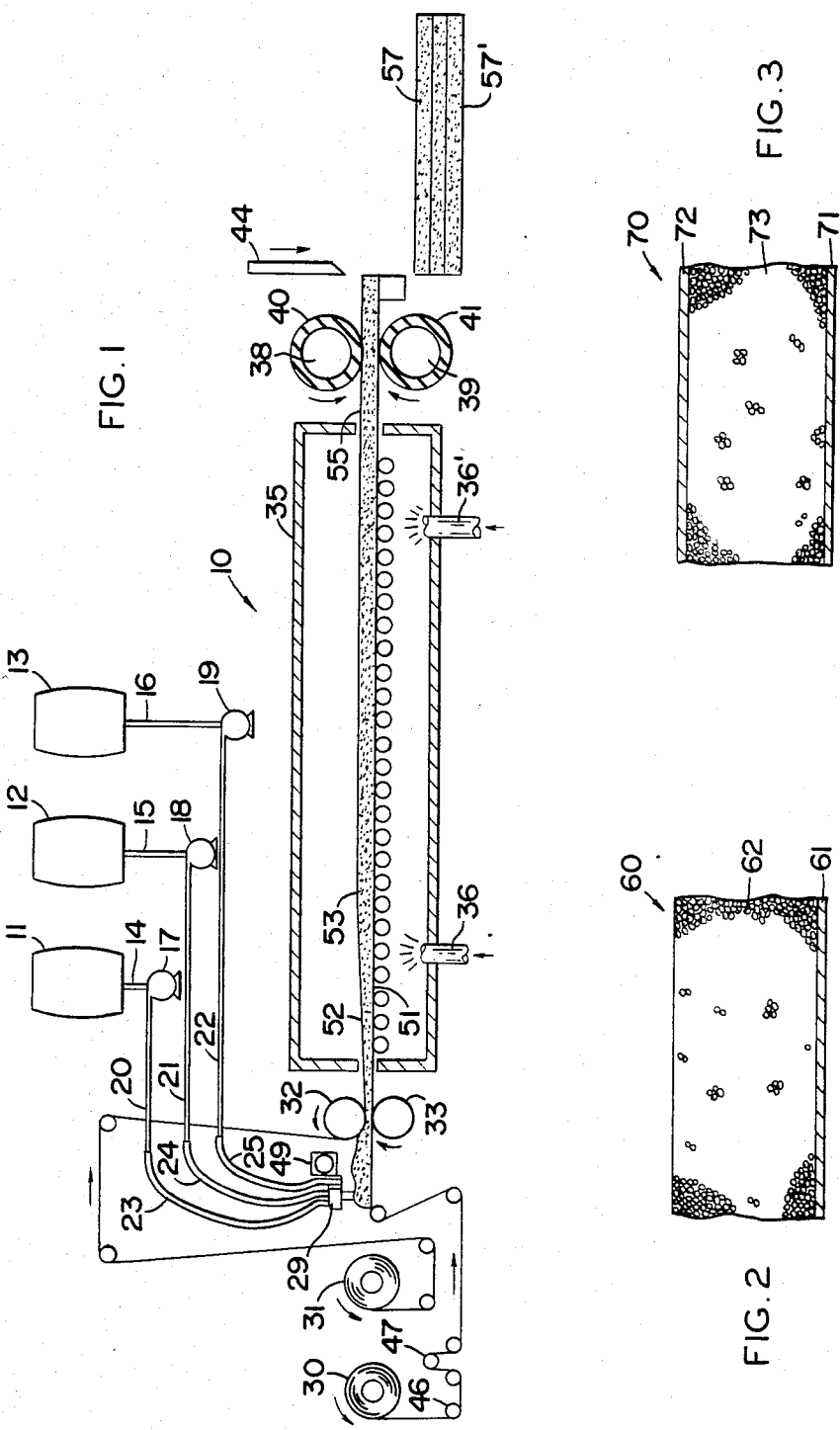

UNSATURATED POLYOXYALKYLENE ADDUCT/FUMARATE DIESTER REACTION PRODUCT FOR CELLULAR FOAM STABILIZATION

BACKGROUND OF THE INVENTION

1. Field of the Invention

This invention relates to the preparation of highly efficient surfactants and their utilization in producing cellular foam materials, particularly isocyanurate and urethane foams. The surfactants can be prepared by reacting under free radical polymerization conditions (1) an unsaturated polyoxyalkylene adduct and (2) an esterified unsaturated dibasic acid ingredient, wherein unsaturated diester ingredient (2) either completely or partially comprises a fumarate diester.

2. Description of the Prior Art

It is known in the manufacture of cellular polymeric materials to utilize small quantities of various cell stabilizing additives, such as silicones, in order to improve the foam's cell quality. While the silicone surface active agents contribute to the production of foamed products having a combination of desirable properties, silicone surfactants are relatively expensive materials.

Another highly effective cellular foam stabilizer of the prior art is the capped reaction product of an alkoxylated amine and a copolymerizable mixture of dialkyl maleate and N-vinyl-2-pyrrolidinone or N-vinyl caprolactam, which is disclosed in U.S. Pat. No. 4,140,842. However, this foam stabilizer is also relatively expensive and has been found to consist of a complex mixture whose components must be separated from each other to realize their particularly desirable cellular foam stabilizing properties.

Moreover, it is now known that there can be used, as relatively inexpensive substitutes for silicone surfactants, the polyoxyalkylene/unsaturated diester reaction products which are disclosed in U.S. Pat. No. 4,365,024. Particularly useful surfactants of this patent are products derived from the free-radical initiated reaction between capped and uncapped polyoxyalkylene adducts and ditridecyl maleate. While these products have proved to be highly satisfactory in promoting the stabilization of many foams, they have been less efficient in certain difficult-to-stabilize urethane and isocyanurate foams.

It would accordingly be highly desirable to provide an improved surface active agent which would be relatively simple and inexpensive to produce, and have good foam stabilizing characteristics in even difficult-to-stabilize urethane and isocyanurate foams.

OBJECTS OF THE INVENTION

It is therefore an object of the present invention to provide improved surfactants for use in preparing fine, closed-cell foam materials, particularly isocyanurate and urethane foams, and a method of producing the surfactants, as well as a method of producing the foams by use of the surfactants.

It is another object of the present invention to provide closed cell polymeric foam materials of high quality and laminated building panels employing the foam materials.

It is still another object of the present invention to produce closed cell polymeric foam materials with high thermal resistance and high insulation properties and a relatively slow increase in thermal conductivity with time.

It is a further object of the present invention to produce polymeric foam materials which exhibit a high closed cell content without adversely affecting friability, compressive strength and the low flammability characteristics of the materials.

It is yet another object of the present invention to provide an improved polyisocyanurate foam which has improved facing sheet adhesion without adversely affecting the other physical and chemical properties of the foam.

It is a still further object of the present invention to provide closed cell polymeric foam materials which can be used in building panels which are highly insulating, thermally resistant, low in friability, soundproof and self-supporting.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet; and FIG. 3 is a cross-sectional view of a laminated building panel having two facing sheets.

DESCRIPTION OF THE INVENTION

The above objects have been achieved by the development of an improved surfactant for foam materials, particularly isocyanurate and urethane foams, which is the reaction product of (1) an unsaturated polyoxyalkylene adduct and (2) an esterified unsaturated dibasic acid or acids, wherein unsaturated diester component (2) includes an amount of fumarate diester effective to bring about grafting of greater than 75, preferably greater than 90, percent by weight of unsaturated diester component (2) to the unsaturated polyoxyalkylene adduct.

More particularly, the foam surfactant of the present invention comprises the reaction product of an esterified unsaturated dibasic acid containing 4 or 5 carbon atoms and an unsaturated polyoxyalkylene adduct in the presence of a free radical initiator, wherein from 40 to 100, preferably 95 to 100, percent of the weight of the unsaturated diester is a fumarate diester. The unsaturated diester can be prepared by reacting together an unsaturated dicarboxylic acid or acid derivative with an alcohol whose hydrocarbon radical can be saturated or unsaturated. The unsaturated diester can also be prepared from a mixture of alcohols.

In the broadest aspects of the present invention, the fumarate diester-containing esterified unsaturated dibasic acid can be reacted with any conventional unsaturated polyoxyalkylene adduct. The unsaturated polyoxyalkylene adduct can be represented by the structural formula

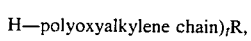

wherein R is an unsaturated organic radical and t is the number of polyoxyalkylene chains reacted onto the R backbone. Preferably, R is an unsaturated organic radical selected from aromatic, aliphatic, cycloaliphatic, and heterocyclic radicals, and combinations of these, and t is an integer from 1 to 50, more preferably 1 to 8, most preferably 1 to 4. Included among the conventional unsaturated polyoxyalkylene adducts which can be employed as starting materials are anionic, cationic and nonionic type surfactants. These surfactants may be used either alone or in admixture with each other. Nonionic type surfactants are preferred.

Among the conventional unsaturated polyoxyalkylene adducts which can be employed are the alkylene oxide adducts of unsaturated organic carboxylic acids, and of unsaturated hydroxyl containing triglycerides.

The adducts are prepared in known manner. Preferably, the alkylene oxides employed in the adduct formation have 2 to 4 carbon atoms, for example, ethylene oxide, 1,2-epoxypropane, the epoxybutanes, and mixtures thereof. Mixed propylene oxide-ethylene oxide adducts can also be used. In the preparation of the latter adducts, the ethylene oxide and propylene oxide are advantageously reacted in the molar ratio of 10:90 to 90:10.

It has been found that the molecular weight and alkylene oxide content of the conventional unsaturated polyoxyalkylene adducts can play an important role in determining the cell stabilizing capacity of the surfactants of the invention. More specifically, certain adducts have been found to require a minimum ethylene oxide or propylene oxide content and molecular weight for more efficient cell stabilization. These requirements can vary for different unsaturated polyoxyalkylene adducts and foam systems but it is possible to establish the satisfactory values for any given foam through routine experimentation.

Examples of commercially available unsaturated polyoxyalkylene adducts for use in the present invention include Flo Mo 36 C from Sellers Chemical Corporation, Peganate CO 36 from Borg-Warner Chemicals, Inc., Cypress CO 36 from Cypress Chemical Co., Ethox CO-36 from Ethox Chemicals, Inc., and Industrol CO-36 from BASF Wyandotte Corporation.

In an advantageous embodiment of the invention, the ester of the unsaturated dibasic acid used in preparing the cell stabilizers of this invention corresponds to the formula:

$$T^1O_2C-C_uH_{2u-2}-CO_2T^2 \qquad (II)$$

wherein u is 2 or 3 and $T^1$ and $T^2$ are identical or different and represent a straight or branched, saturated or unsaturated hydrocarbon chain which preferably contains 4 to 18, more preferably 8 to 18, carbon atoms, and 40 to 100, more preferably 60 to 100, most preferably 95 to 100, percent of the weight of the unsaturated diester comprises a fumarate diester. The hydrocarbon chain of the fumarate diester preferably contains 8 to 18 carbon atoms. Typical examples of the fumarate diesters that may be used include dioctyl fumarate, diisooctyl fumarate, ditridecyl fumarate, and dioleyl fumarate, preferably dioleyl fumarate, dioctyl fumarate and ditridecyl fumarate, most preferably ditridecyl fumarate.

Evidence indicates that the mechanism by which the unsaturated diester reacts with the polyoxyalkylene adduct is by grafting, i.e., the reaction product is composed of the polyoxyalkylene adduct backbone to which are attached at intervals "grafts" of the unsaturated diester. In light of the known inability of unsaturated diesters of the invention to homopolymerize, it is believed that the mechanism of the reaction may involve the addition of single diester units to the polyoxyalkylene backbone.

Analysis of the graft reaction product of ethoxylated castor oil and ditridecyl maleate, which is a preferred stabilizer described in U.S. Pat. No. 4,365,024, reveals the presence of unsaturated diester starting material in the reaction product. The ungrafted diester is believed to contribute to a diminution of the reaction product's cell stabilizing capacity, such as in certain difficult-to-stabilize urethane formulations. It has now been discovered that the amount of grafting can be substantially increased and the cell stabilizing efficiency concomitantly improved by reacting an unsaturated polyoxyalkylene adduct with an unsaturated diester ingredient which either completely or partially comprises a fumarate diester. For example, the free-radical initiated reaction of ethoxylated castor oil with an unsaturated diester comprising a mixture of ditridecyl maleate and ditridecyl fumarate in a weight ratio of approximately 40:60 generates an improved foam stabilizer containing essentially no residual unsaturated diester monomer. When a fumarate diester is used as the sole diester in reaction with the unsaturated polyoxyalkylene adduct, the grafting not only produces a surfactant containing no residual monomer, but also requires far less free-radical initiator than is needed to produce a surfactant from the polyoxyalkylene adduct and maleate diester reactants of U.S. Pat. No. 4,365,024. Moreover, the fumarate graft reaction product is a highly efficient surfactant and can generate fine celled foam in even difficultly foamable urethane formulations.

The surfactant compositions of the invention are produced by reacting together the unsaturated diester and unsaturated polyoxyalkylene adduct in the presence of an effective amount of any conventional free-radical initiator known to be suitable for the graft polymerization of ethylenically unsaturated monomers. Illustrative initiators are the well-known free radical type of vinyl polymerization initiators, for example, the peroxides, persulfates, perborates, percarbonates, azo compounds, etc., including hydrogen peroxide, 1,1-bis(t-butyl-peroxy) cyclohexane, dibenzoyl peroxide, acetyl peroxide, benzoyl hydroperoxide, t-butyl perbenzoate, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo-1-cyclohexane carbonitrile, dimethyl alpha,alpha'-azo-isobutyrate, 4,4'-azo-4-cyanopentanoic acid, azobisisobutyronitrile, persuccinic acid, diisopropyl peroxy dicarbonate, and the like; a mixture of initiators may also be used.

The efficiency of the initiator is conditioned upon its being sufficiently active under the polymerization conditions employed. Particular conditions affecting the initiator's efficiency are, for example, the reaction temperature (in the range from about 30° to about 150° C.), and the nature of the adduct(s) being modified, and, where a metal catalyst(s) is employed, its nature.

Although the efficiency of the initiator is acceptable when it is used alone, an organo transition metal catalyst can be added with the initiator to accelerate the reaction. The preferred metal catalyst is ferrocene. Suitable organometallic catalysts are disclosed in U.S. patent application Ser. No. 319,868, now U.S. Pat. No. 4,438,018, the teachings of which are hereby incorporated by reference.

The free-radical initiated reaction of this invention can be conducted under conditions known to be suitable for free-radical polymerizations, using, e.g., solution, bulk, emulsion, or suspension techniques. It has been found especially useful to carry out the reaction on the unsaturated diester and polyoxyalkylene reactants alone in the presence of the initiator and optionally the metal catalyst.

The reaction is advantageously carried out by mixing the reactants, initiator(s) and optionally metal catalyst(s) at temperatures from about 30° to about 150° C. under an inert atmosphere such as that provided by nitrogen and like inert gases until reaction is complete. The reaction is continued until consumption of the unsaturated diester ceases, as detected by conventional analytical methods, such as gas or liquid chromatography. Reaction times of 1 or more hours can be expected. Any unreacted unsaturated diester can be removed from the total reaction product by conventional methods, such as by solvent extraction. In cases where the amount of grafting is only slightly less than 100%, the total reaction product nevertheless exhibits a cell stabilizing capacity and can profitably be utilized as such. The reaction product of the invention includes both the total reaction product and the reaction product minus unreacted diester.

The initiator(s) and optional metal catalyst(s) can be added at the beginning of the reaction or can be added portionwise at intervals during the course of reaction. Similarly, the unsaturated polyoxyalkylene adduct and esterified unsaturated dibasic acid can be brought together at the beginning of the reaction or can be combined in increments as reaction proceeds, such as by the gradual addition of the diester to a resin kettle containing the adduct.

In a preferred embodiment of the invention the unsaturated diester constitutes between about 5 and 40, more preferably 10 and 30, weight percent of the reaction mixture. The unsaturated diester comprises about 20 weight percent of the reaction mixture in a most advantageous and preferred embodiment of the invention. The concentration of initiator(s) in the mixture is advantageously within the range of about 1 to 30 weight percent, preferably 1.0 to 25 weight percent, based on the total weight of diester(s) present. The use of large amounts of initiator can lead to a reduction in residual diester monomer, but can also result in a large increase in viscosity of the surfactant (>10,000 cps). Surfactant performance in urethane foams was not found to be adversely affected by these higher viscosities. Generally, the optional metal catalyst(s) is utilized at a level of 0.001 to 0.1 grams per gram of initiator. Preferably, 0.001 to 0.06 grams of metal catalyst(s) per gram of initiator are used.

The molecular weight of the conventional unsaturated polyoxyalkylene adduct to be copolymerized can vary over a wide range. However, if the molecular weight is too low, the foam prepared with the subsequently prepared copolymerization product gives coarse cells. No comparable limitation has been found in the case of conventional unsaturated polyoxyalkylene adducts of high molecular weights. The latter adducts can be utilized in the highest molecular weights currently available to yield fine-celled foams in accordance with the present invention. As previously indicated, the suitable molecular weight and alkylene oxide content for any particular adduct and foam system is readily determinable by those skilled in the art. In general, the starting material alkoxylated adduct will have a molecular weight of above about 1000, and advantageously in the range of approximately 2000 to 12,000. The molecular weight can be determined from the equation:

$$M.W. = \frac{56.1 \times 1000 \times f}{OH}$$

where

M.W. = molecular weight of the unsaturated polyoxyalkylene adduct, f = functionality, that is, average number of hydroxyl groups per molecule of unsaturated polyoxyalkylene adduct, and OH = hydroxyl number of the unsaturated polyoxyalkylene adduct.

In certain foam systems it is desirable that the conventional unsaturated polyoxyalkylene adduct used in the present invention be treated with a suitable agent to cap its hydroxyl groups. Suitable capping agents are those organic compounds capable of reacting with compounds containing active hydrogen groups, such as hydroxyl groups, as determined by the Zerewitinoff method. The capping agents convert the hydroxyl groups of the unsaturated polyoxyalkylene adduct to groups which are substantially chemically inert in the cellular foam-forming mixtures of the invention. The capping reaction takes place under conditions well known in the art; as, for example, described in Sandler, S. R. and Karow, "Organic Functional Group Preparations," Organic Chemistry, A Series of Monographs Edited by A. J. Blomquist, Academic Press, New York and London, 1968 Edition, pages 246-247, 1971 Edition, Vol. II, page 223 and 1972 Edition, Vol. III, page 13, the descriptions of which are incorporated herein by reference. The capping treatment may take place either before or after the copolymerization. Suitable capping agents include organic acids, acid anhydrides, acid chlorides, and acyloxy chlorides, such as a lower alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly, aromatic acids, anhydrides and chlorides can be employed. Benzoyl chloride and substituted products of it such as 3,5-dinitrobenzoyl chloride are examples of these. Alkyl and aromatic isocyanates can also be employed. Other factors, such as solubility in the unsaturated polyoxyalkylene adduct being treated and the solubility of the capped surfactant in whatever resin system is to be stabilized, are considerations of which a practitioner in the art is cognizant in selecting the capping system which will yield the desired closed cell stabilized foam. Examples of suitable capping agents are acetic acid, acetic anhydride, acetyl chloride and 3,5-dinitrobenzoyl chloride. The preferred capping agent is acetic anhydride. The capping treatment is typically performed at temperatures ranging from 50° to 140° C. and is advantageously carried out until the surfactant has a hydroxyl value of less than 50, and preferably less than 10. The hydroxyl number is determined by the ASTM-D 1638 test. It may be highly advantageous in certain foam systems to strip off any acid formed during the capping treatment, as, e.g., the acetic acid formed in using acetic anhydride as capping agent. The capped reaction product of the claims includes both the stripped and unstripped product.

One of the preferred surfactants of the present invention is the capped or uncapped product of the reaction of the unsaturated diester of the invention and an ethoxylated castor oil. The latter material is prepared by ethoxylating the hydroxy groups on the triester of ricinoleic acid. For purposes of the present invention, it is advantageous that the resulting ethoxylated product contains at least 25 moles of ethylene oxide per mole of castor oil. The ethylene oxide content is preferably 25 to 60, most preferably 35 to 40, moles per mole of oil.

The products obtained by reacting together an unsaturated polyoxyalkylene adduct and unsaturated diester in accordance with the present invention can be utilized as cellular foam stabilizing surfactants. By cellular foam stabilizing surfactants are meant those which keep the foam from collapsing and rupturing. Surfactants obtained in accordance with this invention are found to be especially useful cell stabilizers in isocyanurate and urethane foams. They have the capability of giving fine-celled, low k-factor foams.

The surfactant of the invention is employed in a cell stabilizing amount in the foam-forming composition of the invention. Generally, the surfactant comprises from 0.05 to 10, and preferably comprises from 0.1 to 6, weight percent of the composition. Too little surfactant fails to stabilize the foam and too much surfactant is wasteful. Those surfactants which are non-ionic are particularly good cell stabilizers. In certain foam systems, e.g., involving polyisocyanurate polymers, the capped polyol is preferred.

The cellular product formed by using the surfactant of the invention has a uniform, fine-celled structure. Uniformity of cells is determined by visual and microscopic examination. This property of producing a fine-celled foam is tested by mixing 0.1 to 5% of the surfactant with the foam-forming composition and producing a foam as described herein.

The average cell size diameter should ideally be less than 0.2 mm and is more preferably less than 0.1 mm (ASTM D-2842). Fine-celled foams can by the means set forth in the invention be rendered closed cells. The blowing agent is then trapped in the cells. One means of expressing the containment in the cells of the blowing agent is by use of the k-factor drift value. Unfaced cellular materials containing fluorocarbon gas have initial k-factors in the vicinity of 0.1–0.2 at 24° C. This low value increases over a period of months or sometimes days. The change is expressed as the k-factor drift. The k-factor is measured at a mean temperature of 24° C. The value is redetermined at various time intervals up to about 1000 days. A material exhibiting fast k-drift will attain a k-factor (BTU/hr-°F.-ft$^2$ per inch thickness) of at least 0.2 within 25 days. A slow k-drift material may require between 200 days and over two years to attain a 0.2 value. Any material which possesses a k-value under 0.2 will provide high thermal resistance. Obviously, the longer this value or a lower value is maintained, the better the efficiency.

Ball, Hurd, and Walker have published a comprehensive discussion of k-factor changes as a function of time. ("The Thermal Conductivity of Rigid Urethane Foams", J. Cellular Plastics, March/April, 1970, pp. 66–78). F. Norton ("Thermal Conductivity and Life of Polymer Foams", J. Cellular Plastics, January, 1967, pp. 23–37) has shown that diffusion of fluorocarbon gases out of unfaced foam and infusion of air into the foam causes an increase in k-factor. A slow k-drift foam is defined as one that attains a k-factor at 24° C. of 0.15–0.19 after 200–400 days and then remains below 0.2 k-factor for 5–10 years. Eventually all fluorocarbon diffuses from the foam to leave a closed cell material which contains only air in the cells.

The k-factor for the closed cell foam containing only air falls in the range of 0.22–0.26 BTU/hr-°F.-ft$^2$ per inch thickness at 24° C. for the 2–3 lbs/ft$^3$ density range. Therefore, if a foam exhibits greater than 0.2 k-factor after a short period of time (less than 25 days), then substantially all fluorocarbon has diffused from the foam and has been replaced by air. On the other hand, if the k-factor remains below 0.2 for at least 100 days, then a substantial amount of fluorocarbon gas remains in the closed cells of the foam in spite of infusion of air.

It has been found that use of surfactants of the invention results in fine-celled foams with a high closed cell content, a low initial k-factor and a low k drift value.

Surfactants of the present invention are particularly useful in the preparation of polyurethane foams and polyisocyanurate foams. The surfactant generally comprises from 0.05 to 4, and preferably comprises from 0.1 to 2, weight percent of the foam-forming composition.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1, 6-diisocyanate, tetramethylene-1,4-diisocyanate, cyclohexane-1, 4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylenepolyphenyl isocyanates. These isocyanates are prepared by conventional methods known in the art such as the phosgenation of the corresponding organic amine.

The polyols which can be employed in the preparation of the foam compositions include, for example, monomeric polyols, such as ethylene glycol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

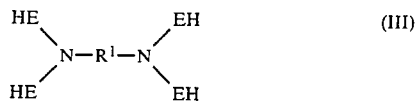

wherein $R^1$ is an alkylene radical containing at least 2 to 6 carbon atoms and E is a polyoxyalkylene chain; amine based polyethers of the formula:

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basillic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol) propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The polyurethane foams are prepared by reacting the polyol and polyisocyanate on an essentially 1:1 to 1:1.2 equivalent basis. The organic polyisocyanate is mixed together with the desired polyol, surfactant, catalyst and blowing agent at temperatures ranging from about 0° C. to 150° C.

Any blowing agent typically employed in similar prior art foam products containing polyisocyanurate and/or polyurethane linkages can be employed in the compositions of the present invention. In general, these blowing agents are liquids having an atmospheric pressure boiling point between minus 50° and plus 100° C. and preferably between zero and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any of the catalysts conventionally employed in the art to catalyze the reaction of an isocyanate with a reactive hydrogen containing compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N', N'-tetramethyl-1,3-butanediamine, N,N-dimethylethanolamine, N,N-diethylethanolamine, and the like. The catalysts generally comprise from 0.1 to 20, and preferably from 0.3 to 10, weight percent of the total composition.

Other additives may also be included in the foam formulations. Included are flame retardants, such as tris(2-chloroethyl)-phosphate, and additional surfactants, such as the silicone surfactants, e.g., alkylpolysiloxanes and polyalkylsiloxanes. Examples of such additional surfactants are the polydimethylsiloxane-polyoxyalkylene block copolymers available from the Union Carbide Corporation under the tradenames "L-5410" and "L-5340" and from the Dow Corning Corporation under the tradename "DC-193."

In a preferred rigid foam of the invention containing polyisocyanurate linkages, the organic polyisocyanate is polymethylene polyphenylisocyanate. The polymethylene polyphenylisocyanates desirably have a functionality of at least 2.1 and preferably 2.5 to 3.8. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention are a mixture of those of Formula V:

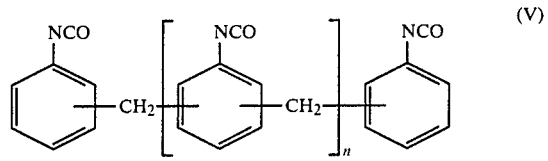
(V)

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of Formula V, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973 and now abandoned. The synthesis of polymethylene polyphenylisocyanates is described in Seeger et al., U.S. Pat. No. 2,683,730 and in Powers U.S. Pat. No. 3,526,652 at Column 3, Lines 6-21. It should, therefore, be understood that the polymethylene polyphenylisocyanate available on the market under the tradenames of PAPI-580 (Upjohn) and Mondur MR-200 (Mobay) can successfully be employed within the spirit and scope of the present invention.

In the broadest aspects of the present invention, any diol having an equivalent weight, which is generally between 30 and 250, and preferably between 30 and 200, and having two hydroxyl groups which pass the Zerewitinoff Test, can be employed to react with the polymethylene polyphenylisocyanates described in the three immediately preceding paragraphs to produce preferred rigid foams of the invention. Triols and higher polyols can be admixed with these diols in minor amounts generally less than 40 percent provided the equivalent weight of the mixture is within the specified range. Suitable diols include those of Formula VI:

$$HO-R^2-OH \qquad (VI)$$

wherein $R^2$ is selected from the group consisting of lower alkylene and lower alkoxyalkylene with at least two carbon atoms. Illustrative of such diols are ethylene glycol, 1,2-propanediol, 1,3-propanediol, 1,4-butanediol, diethylene glycol, dipropylene glycol, dimethylol dicyclopentadiene, 1,3-cyclohexanediol, and 1,4-cyclohexanediol. Diethylene glycol is preferred since it is a relatively inexpensive material and gives a core of low friability.

A preferred polyol mixture which can be employed in the preparation of the polyisocyanurate foams of the invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, the disclosure of which is hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate ® resins.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

The properties of the transesterified polyol mixtures which can be employed in accordance with the present invention fall within rather broad ranges. The polyol mixtures are described in U.S. Pat. No. 4,237,238, the disclosure of which is hereby incorporated by reference. A preferred polyol mixture is characterized by a viscosity in cps at 25° C. of about 8,000 to about 30,000, a free diethylene glycol content of from about 5 to about 10 percent by weight of said mixture, a hydroxyl number within a range of from about 247 to about 363, and an acid number of about 2 to about 8.

Another preferred polyol mixture which can be employed in producing the polyisocyanurate foams of the invention is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of (a) about 40 to 60 percent by weight of dimethyl terephthalate, (b) about 1 to 10 percent by weight of monomethyl terephthalate, (c) about 1 to 2 percent by weight of terephthalic acid, (d) about 10 to 25 percent by weight of bi-ring esters, (e) about 5 to 12 percent by weight of organic acid salts, (f) about 18 to 25 percent by weight of polymeric materials, and (g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. An example of a transesterified by-product fraction of the invention is the product supplied by Jim Walter Resources, Inc. under the trade designation Foamol 250.

The properties of the polyol mixture produced by transesterifying the by-product fraction defined above are described in U.S. application Ser. No. 344,459, filed Feb. 1, 1982, now U.S. Pat. No. 4,411,949, the disclosure of which is hereby incorporated by reference. A preferred polyol mixture is characterized by a viscosity in cps at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Other desirable polyols for use in the present invention are those described in U.S. Pat. No. 4,212,917 and U.S. application Ser. No. 372,904, filed Apr. 29, 1982, the disclosures of which patent and application are hereby incorporated by reference.

In order to ensure complete reaction, the polymethylene polyphenylisocyanate and the polyol or mixture of polyols are generally mixed in an equivalent ratio of 2:1 to 6:1 and preferably 3:1 to 5:1. In ranges outside these proportions the reaction yields a product having undesirable physical characteristics. At higher ratios the product has an undesirably high friability. At lower ratios the product has an undesirably high flammability.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris (dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent and the surfactant, and the polyol tank 12 is charged with the polyol, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21 and 22 as well as lines 23, 24, and 25, whereupon they are mixed in the mixing head 29 and discharged therefrom. Alternatively, lines 21 and 22 can be combined prior to the mixing head. The pull rolls 38, 39 each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol, the diol, and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. No. 4,118,533, the disclosure of which is hereby incorporated by reference.

The invention is further illustrated by the following examples in which all parts and percentages are by weight unless otherwise indicated.

EXAMPLE 1

Preparation of Ethoxylated Castor Oil-Unsaturated Diester Surfactants

This example illustrates the preparation of a series of capped and uncapped ethoxylated castor oil-unsaturated diester surfactants.

In the preparation of the capped surfactants, 200 parts of ethoxylated castor oil and 27 parts of acetic anhydride were added to a 500 ml vessel equipped with an overhead stirrer. An argon stream was provided through the vessel. After heating these ingredients to 100° C. for two hours, the acetic acid was stripped off in vacuo to yield a liquid product with an acid number of less than 2.0. In the preparation of the uncapped surfactants, 200 parts of ethoxylated castor oil was likewise added to a 500 ml vessel equipped with an overhead stirrer, but no capping treatment was carried out.

To 200 parts of both the capped and the uncapped material were added 50 parts of unsaturated diester and the initiator 1,1-bis (t-butylperoxy) cyclohexane in the amount shown in Table I below. The mixture was then reacted for 4 hours at 110° C. under an argon atmosphere to yield a viscous liquid surfactant.

The residual diester monomer level and viscosity of each surfactant prepared according to the above procedure are shown in the following Table I. The results in the table reveal that, while the surfactants made with ditridecyl maleate had residual monomer concentrations ≧6%, those made with the diester mixture of ditridecyl maleate (ca. 40%) and ditridecyl fumarate (ca. 60%) had very little or no residual monomer, indicating that use of the fumarate-containing mixture leads to essentially total grafting of diester onto the ethoxylated castor oil. Table I also shows that the surfactants made with the fumarate-containing mixture possess a reasonable viscosity in the range of approximately 2500-5000 cps.

In each foam synthesis, the following quantities of the following ingredients were combined as indicated:

| Item | Ingredient | Quantity (grams) |
|---|---|---|
| A | Polymethylene polyphenyl isocyanate | 230 |
| B | Terate 202 | 70 |
| C | 2,4,6-tris (dimethylaminomethyl) phenol | (See below) |
| D | Potassium-2-ethyl hexoate (70% solution in E) | (See below) |
| E | Polyoxyethylene glycol | (See below) |
| F | CFCl$_3$ | 50 |
| G | Surfactant (See Table II below) | 2.5 |

A large batch of polymethylene polyphenyl isocyanate and CFCl$_3$ in the ratio 230 parts:50 parts, respectively, was prepared by mixing together the two ingredients and storing them at 0°-15° C. In each foam preparation, 280 g of the polymethylene polyphenyl isocyanate/CFCl$_3$ mixture, at a temperature of 15° C., was poured into a reaction vessel, 2.5 g of the surfactant (shown in Table II below) and 70 g of an aromatic polyester polyol mixture supplied by Hercules Inc. under the trademark "Terate 202" were then added to the vessel, and all ingredients were mixed at 3600 rpm for 10 seconds. The catalyst mixture (ca. 14 g) described below was then mixed into the contents of the vessel over a 5 second interval. All ingredients were thereafter mixed at 3600 rpm for an additional 7-10 seconds and then poured into a box, yielding a polyisocyanurate foam.

Various characteristics of the foams produced are shown in the following Table II. The polyisocyanurate foams were of good quality.

In the above syntheses, Item A is a polymethylene polyphenyl isocyanate having an equivalent weight of 138, an acidity of 0.03% HCl, and a viscosity of 2000 centipoises at 25° C. and is available from the Mobay Chemical Corporation, Pittsburgh, Pa. under the trade name MONDUR MR-200.

Item C is that supplied by the Rohm & Hass Chemical Company under the trade name DMP-30.

Item D is employed in the form of a 70-weight % solution in the polyoxyethylene glycol (Item E) sold by

TABLE I

ETHOXYLATED CASTOR OIL[1]-UNSATURATED DIESTER SURFACTANTS

| SURFACTANT NO. | DIESTER UTILIZED | CAPPING PERFORMED | INITIATOR[4] (pts) | RESIDUAL DIESTER (%) | BROOKFIELD VISCOSITY (cps) |
|---|---|---|---|---|---|
| 1 | DTDM[2] | No | 6.6 | 7.7 | 2440 |
| 2 | " | No | 7.2 | 6.0 | 3150 |
| 3 | Diester Mixture[3] | No | 6.6 | 1.0 | 3380 |
| 4 | " | No | 7.7 | 0 | 4250 |
| 5 | " | No | 8.8 | 0 | 5100 |
| 6 | DTDM[2] | Yes | 6.6 | 8.4 | 1470 |
| 7 | " | Yes | 7.2 | 7.4 | 2060 |
| 8 | Diester Mixture[3] | Yes | 6.6 | 1.2 | 2500 |

[1]Ethoxylated Castor Oil = Flo Mo 36C supplied by Sellers Chemical Corporation.
[2]DTDM = Ditridecyl maleate supplied by McIntyre Chemical Company, and analyzed by LC to be ≧95% pure, the remainder being the fumarate isomer.
[3]Diester Mixture = mixture supplied by Finetex Chemicals Inc., and analyzed by LC to be a mixture of ditridecyl maleate:ditridecyl fumarate in a weight ratio of approximately 40:60.
[4]Initiator = 1,1-bis (t-butylperoxy) cyclohexane supplied by Witco Chemical Company under the trade name USP-400P.
[5]Weight percent based on total weight of surfactant, and determined by LC.

EXAMPLE 2

This example illustrates the synthesis of polyisocyanurate foams utilizing Surfactant Nos. 6-8 of Example 1.

the Union Carbide Corporation under the trade name Carbowax 200.

The catalyst mixture of Items C, D and E added in the above-described foam preparation is a blend of DMP-30: potassium-2-ethyl hexoate:polyoxyethylene glycol in a 1:3:8 weight ratio.

TABLE II

SURFACTANTS IN POLYISOCYANURATE FOAMS

| FOAM | SURFACTANT NO. | CREAM TIME (sec) | FIRM TIME (sec) | DENSITY (pcf) | FRIABILITY (% wt. loss, 10 min) | CELL QUALITY |
|---|---|---|---|---|---|---|
| A | 6[1] | 22 | 45 | — | — | Fine-celled |
| B | 7[1] | 20 | 42 | — | — | Fine-celled |
| C | 8[2] | 19 | 45 | 1.92 | 11.9 | Fine-celled |

[1]Ditridecyl maleate used in preparing the surfactant.
[2]Mixture of ditridecyl maleate:ditridecyl fumarate in approximately 40:60 weight ratio used in preparing the surfactant.

EXAMPLE 3

This example illustrates the synthesis of polyurethane foams utilizing Surfactant Nos. 3–5 of Example 1.

In each foam synthesis, the following quantities of the following ingredients were combined as indicated:

| Item | Ingredient | Quantity (grams) |
|---|---|---|
| A | Polymethylene polyphenyl isocyanate | 174.8 |
| B | Urethane polyol | 123.6 |
| C | Flame retardant | 13.7 |
| D | $CFCl_3$ | 62.6 |
| E | Surfactant (See Table III below) | 2.0 |
| F | Amine catalyst | 2.0 |
| G | Tin catalyst | 0.14 |

A large batch of polyol premix was prepared by mixing together Items B, C, and D (ca. 1 gal) and cooling the resulting mixture to 15° C. In the foam synthesis, 199.9 g of the polyol premix at a temperature of 15° C. was poured into a reaction vessel. 2.0 g Item E, 2.0 g Item F and 0.14 g Item G were then added to the vessel, and all ingredients were mixed at 1000 rpm for ca. 10 seconds. 174.8 g Item A was then added to the vessel and all ingredients were mixed at 3500 rpm for 15 seconds, and thereafter poured into a box to yield a rigid polyurethane foam.

In the above synthesis, Item A is a polymethylene polyphenyl isocyanate having a viscosity of 700 centipoises at 25° C. and is available from the Upjohn Chemical Company, New Haven, Conn. under the trade name PAPI 580.

Item B is that supplied by the Mobay Chemical Corporation under the trade name Multranol E9221.

Item C is that supplied by the Stauffer Chemical Corporation under the trade name Fyrol 6.

Item F is that supplied by Abbott Laboratories under the trade name Polycat 8.

Item G is that supplied by Cincinnati Milacron under the trade name Advastab TM 181.

Various characteristics of the polyurethane foams produced are shown in the following Table III. The polyurethane foams were good quality foams having fine-celled structures.

TABLE III

SURFACTANTS IN POLYURETHANE FOAMS

| FOAM | SURFACTANT NO. | CREAM TIME (sec) | FIRM TIME (sec) | DENSITY (pcf) | K-FACTOR[2] AFTER | | | |
|---|---|---|---|---|---|---|---|---|
| | | | | | 1 day | 28 days | 56 days | 120 days |
| A | 3[1] | 19 | 56 | 2.03 | .139 | .169 | .170 | .181 |
| B | 4[1] | 20 | 55 | 1.99 | .139 | .165 | .172 | .186 |
| C | 5[1] | 19 | 55 | 1.95 | .136 | .161 | .171 | .180 |

[1]Mixture of ditridecyl maleate:ditridecyl fumarate in approximately 40:60 weight ratio used in preparing the surfactant.
[2]Units = Btu-in/hr-ft$^2$-°F.

EXAMPLE 4

Preparation of Ethoxylated Castor Oil-Unsaturated Diester Surfactants

This example illustrates the preparation of surfactants by reacting capped ethoxylated castor oil with different amounts of the diester mixture of Example 1.

Each surfactant synthesis was performed according to the procedure of Example 1 for capped surfactants, utilizing the capped ethoxylated castor oil, diester mixture and initiator described in said example in the amounts shown in Table IV below.

The data presented in Table IV demonstrates the grafting efficiency of the fumarate-containing diester mixture of the invention. Surfactant Nos. 9–11, prepared with 25, 30 and 35 percent by weight, respectively, of the diester mixture, had acceptable viscosities and only 2–3% residual monomer, which is less than half the amount of unreacted monomer left after the free-radical initiated reactions of Example 1 which involved the grafting of only 20 percent by weight of ditridecyl maleate.

TABLE IV

SURFACTANTS PREPARED WITH INCREASED LEVELS OF UNSATURATED DIESTER

| SURFACTANT NO. | CAPPED ETHOXYLATED CASTOR OIL (g) | DIESTER MIXTURE[2] (g) | INITIATOR[3] (g) | WEIGHT PERCENT OF DIESTER MIXTURE[4] | RESIDUAL DIESTER (%)[5] | BROOKFIELD VISCOSITY (cps) |
|---|---|---|---|---|---|---|
| 9 | 100 | 33.4 | 4.0 | 25 | 2.2 | 4900 |
| 10 | 100 | 42.9 | 4.5 | 30 | 2.6 | — |

TABLE IV-continued

SURFACTANTS PREPARED WITH INCREASED LEVELS OF UNSATURATED DIESTER

| SURFACTANT NO. | CAPPED ETHOXYLATED CASTOR OIL (g) | DIESTER MIXTURE[2] (g) | INITIATOR[3] (g) | WEIGHT PERCENT OF DIESTER MIXTURE[4] | RESIDUAL DIESTER (%)[5] | BROOKFIELD VISCOSITY (cps) |
|---|---|---|---|---|---|---|
| 11 | 100 | 53.8 | 5.2 | 35 | 2.2 | 7460 |

[1]Ethoxylated Castor Oil = Flo Mo 36C supplied by Sellers Chemical Corporation.
[2]Diester Mixture = mixture supplied by Finetex Chemicals Inc., and analyzed by LC to be a mixture of ditridecyl maleate:ditridecyl fumarate in a weight ratio of approximately 40:60.
[3]Initiator = 1,1-bis (t-butylperoxy) cyclohexane supplied by Witco Chemical Company under the trade name USP-400P.
[4]Based on total weight of ethoxylated castor oil and diester mixture.
[5]Weight percent based on total weight of surfactant, and determined by LC.

EXAMPLE 5

This example illustrates the synthesis of polyisocyanurate foams utilizing Surfactant Nos. 9–11 of Example 4.

In each foam synthesis, the following quantities of the following ingredients were combined as indicated:

| Item | Ingredient | Quantity (grams) |
|---|---|---|
| A | Polymethylene polyphenyl isocyanate | 277 |
| B | Diethylene glycol | 23 |
| C | 2,4,6-tris (dimethylaminomethyl) phenol | (See below) |
| D | Potassium-2-ethyl hexoate (70% solution in E) | (See below) |
| E | Polyoxyethylene glycol | (See below) |
| F | $CFCl_3$ | 55 |
| G | Surfactant (See Table V below) | 2.5 |

A large batch of polymethylene polyphenyl isocyanate and $CFCl_3$ in the ratio 277 parts:55 parts, respectively, was prepared by mixing together the two ingredients and storing them at 0°–15° C. In each foam preparation, 332 g of the polymethylene polyphenyl isocyanate/$CFCl_3$ mixture, at a temperature of 15° C., was poured into a reaction vessel, 2.5 g of the surfactant (shown in Table V below) and 23 g of diethylene glycol were then added to the vessel, and all ingredients were mixed at 3600 rpm for 5 seconds. The catalyst mixture (ca. 14.5 g) described below was then mixed into the contents of the vessel over a 5 second interval. All ingredients were thereafter mixed at 3600 rpm for an additional 7 seconds and then poured into a box, yielding a polyisocyanurate foam.

Various characteristics of the foams produced are shown in the following Table V. The polyisocyanurate foams were of good quality and exhibited better adhesion to an ashphalt coated glass facer than did foams made with a surfactant produced analogously to Surfactant No. 6 of Example 1.

In the above syntheses, Item A is a polymethylene polyphenyl isocyanate having an equivalent weight of 138, an acidity of 0.03% HCl, and a viscosity of 2000 centipoises at 25° C. and is available from the Mobay Chemical Corporation, Pittsburgh, Pa. under the trade name MONDUR MR-200.

Item C is that supplied by the Rohm & Haas Chemical Company under the trade name DMP-30.

Item D is employed in the form of a 70-weight % solution in the polyoxyethylene glycol (Item E) sold by the Union Carbide Corporation under the trade name Carbowax 200.

The catalyst mixture of Items C, D and E added in the above-described foam preparation is a blend of DMP-30: potassium-2-ethyl hexoate:polyoxyethylene glycol in a 1:3:8 weight ratio.

TABLE V

SURFACTANTS IN POLYISOCYANURATE FOAMS

| FOAM | SURFACTANT NO. | CREAM TIME (sec) | FIRM TIME (sec) | CELL QUALITY |
|---|---|---|---|---|
| A | 9[1] | 20 | 50 | Fine-celled |
| B | 10[2] | 20 | 50 | Fine-celled |
| C | 11[3] | 20 | 50 | Fine-celled |

[1]25 weight percent of diester mixture used in preparing the surfactant.
[2]30 weight percent of diester mixture used in preparing the surfactant.
[3]35 weight percent of diester mixture used in preparing the surfactant.

EXAMPLE 6

This example illustrates the synthesis of polyurethane foams utilizing Surfactant Nos. 9–11 of Example 4.

In each foam synthesis, the following quantities of the following ingredients were combined as indicated:

| Item | Ingredient | Quantity (grams) |
|---|---|---|
| A | Polymethylene polyphenyl isocyanate | 129.0 |
| B | Urethane polyol | 100 |
| C | $CFCl_3$ | 41 |
| D | Surfactant (See above) | 2.0 |
| E | Amine catalyst | 3.0 |

A large batch of polyol premix was prepared by mixing together Items B and C (ca. 1 gal). In the foam synthesis, 141.0 g of the polyol premix at a temperature of 25° C. was poured into a reaction vessel. 2.0 g Item D and 3.0 g Item E were then added to the vessel, and all ingredients were mixed at 1000 rpm for ca. 10 seconds. 129.0 g Item A was then added to the vessel and all ingredients were mixed at 3500 rpm for 15 seconds, and thereafter poured into a box to yield a rigid polyurethane foam.

In the above synthesis, Item A is a polymethylene polyphenyl isocyanate having a viscosity of 150–250 centipoises at 25° C. and is available from the Mobay Chemical Corporation, Pittsburgh, Pa. under the trade name Mondur MR.

Item B is that supplied by the Mobay Chemical Corporation under the trade name Multranol 4034.

Item E is that supplied by Abbott Laboratories under the trade name Polycat 8.

The polyurethane foams produced utilizing Surfactant Nos. 9–11 were good quality foams having fine-celled structures. Utilization of a surfactant prepared analogously to Surfactant No. 1 of Example 1 in the same urethane foam formulation gave coarse celled foam.

EXAMPLE 7

Preparation of Ethoxylated Castor Oil-Ditridecyl Fumarate Surfactants

This example illustrates the synthesis of uncapped surfactants from ethoxylated castor oil and ditridecyl fumarate utilizing different levels of initiator.

Each surfactant synthesis was performed according to the procedure of Example 1 for uncapped surfactants employing ethoxylated castor oil and the initiator 1,1-bis(t-butylperoxy)cyclohexane in the amounts shown in Table VI below, and replacing the unsaturated diesters of Example 1 by ditridecyl fumarate (DTDF) in the amounts shown in the following Table VI.

The Table VI results show that in the preparation of the ethoxylated castor oil/ditridecyl fumarate reaction product the level of initiator can be reduced to about 6.0 weight percent, based on the weight of diester utilized, without leaving ungrafted diester after reaction (Surfactant No. 16). Total grafting of the fumarate diester onto ethoxylated castor oil is achieved with only about half the amount of initiator utilized in the free-radical initiated reactions of Example 1 which involve grafting of ditridecyl maleate. The data in Table VI also show that lowering the level of initiator in grafting the fumarate diester onto the unsaturated polyoxyalkylene adduct brings about an accompanying beneficial reduction in viscosity of the resultant surfactant.

129.0 g Item A was then added to the vessel and all ingredients were mixed at 3500 rpm for 15 seconds, and thereafter poured into a box to yield a rigid polyurethane foam.

In the above synthesis, Item A is a polymethylene polyphenyl isocyanate having a viscosity of 150–250 centipoises at 25° C. and is available from the Mobay Chemical Corporation, Pittsburgh, Pa. under the trade name Mondur MR.

Item B is that supplied by the Mobay Chemical Corporation under the trade name Multranol 4034.

Item E is that supplied by Abbott Laboratories under the trade name Polycat 8.

Each polyurethane foam produced with an ethoxylated castor oil-ditridecyl fumarate surfactant according to the above procedure was of better quality than the corresponding foam produced with a surfactant prepared analogously to Surfactant No. 1 of Example 1. Surfactant Nos. 12–16 generated the best quality cellular foams produced according to this example.

EXAMPLE 9

This example illustrates the synthesis of polyurethane foams utilizing as surfactants an inventive ethoxylated castor oil-ditridecyl fumarate surfactant (Surfactant No. 16 of Example 7) and a comparative surfactant (Surfactant No. 22) prepared from uncapped ethoxylated castor oil and ditridecyl maleate in an analogous manner to Surfactant No. 1 of Example 1.

TABLE VI
ETHOXYLATED CASTOR OIL-DITRIDECYL FUMARATE SURFACTANTS

| SURFACTANT NO. | ETHOXYLATED CASTOR OIL[1] (pts) | DTDF[2] (pts) | INITIATOR[3] (pts) | RESIDUAL DTDF (%)[4] | BROOKFIELD VISCOSITY (cps) |
|---|---|---|---|---|---|
| 12 | 200 | 50 | 6.6 | 0 | 7000 |
| 13 | 200 | 50 | 6.0 | 0 | 6800 |
| 14 | 200 | 50 | 5.4 | 0 | 6050 |
| 15 | 200 | 50 | 4.0 | 0 | 4650 |
| 16 | 200 | 50 | 3.0 | 0 | 3770 |
| 17 | 200 | 50 | 2.5 | 2.1 | 2800 |
| 18 | 200 | 50 | 2.0 | 3.3 | 2080 |
| 19 | 200 | 50 | 2.0 | 4.3 | 2700 |
| 20 | 200 | 50 | 1.5 | 3.4 | 2100 |
| 21 | 200 | 50 | 1.0 | 6.1 | 1300 |

[1]Ethoxylated Castor Oil = Flo Mo 36C supplied by Sellers Chemical Corporation.
[2]DTDF = Ditridecyl Fumarate supplied by Reichhold Chemicals, Inc., and analyzed by LC to be ≧95% pure, the remainder being the maleate isomer.
[3]Initiator = 1,1-bis (t-butylperoxy) cyclohexane supplied by Witco Chemical Company under the trade name USP-400P.
[4]Weight percent based on total weight of surfactant, and determined by LC.

EXAMPLE 8

This example illustrates the synthesis of polyurethane foams utilizing Surfactant Nos. 12–16, 18 and 21 of Example 7.

In each foam synthesis, the following quantities of the following ingredients were combined as indicated:

| Item | Ingredient | Quantity (grams) |
|---|---|---|
| A | Polymethylene polyphenyl isocyanate | 129.0 |
| B | Urethane polyol | 100 |
| C | CFCl$_3$ | 41 |
| D | Surfactant (See above) | 2.0 |
| E | Amine catalyst | 3.0 |

A large batch of polyol premix was prepared by mixing together Items B and C (ca. 1 gal). In the foam synthesis, 141.0 g of the polyol premix at a temperature of 25° C. was poured into a reaction vessel. 2.0 g Item D and 3.0 g Item E were then added to the vessel, and all ingredients were mixed at 1000 rpm for ca. 10 seconds.

A. URETHANE FORMULATIONS USED IN PREPARING FOAMS

The inventive and comparative surfactants were employed in preparing foams from five different urethane formulations, which are presented in the following Table VII.

TABLE VII
FORMULATION 1

| Item | Ingredient | Quantity (grams) |
|---|---|---|
| A | Polymethylene polyphenyl isocyanate[1] | 174.8 |
| B | Sucrose amine polyol[2] | 100 |
| C | Chlorinated butylene oxide[3] | 30 |
| D | CFCl$_3$ | 61.9 |
| E | Surfactant (See Table VIII below) | 2.0 |
| F | N,N—dimethylcyclohexylamine[4] | 2.0 |

TABLE VII-continued

| G | Tin mercaptide[5] | 2.4 |

[1]Item A is that supplied by the Upjohn Chemical Company under the trade name PAPI 580.
[2]Item B is that supplied by the Olin Corporation under the trade name Poly G 71-530.
[3]Item C is a flame retardant supplied by the Olin Corporation under the trade name Thermolin RF 230.
[4]Item F is an amine catalyst supplied by Abbott Laboratories under the trade name Polycat 8.
[5]Item G is a catalyst supplied by Cincinnati Milacron under the trade name Advastab TM 181. Prior to use, the catalyst was diluted to 10% with Pluracol 726 supplied by BASF Wyandotte Corporation.

FORMULATION 2

| Item | Ingredient | Quantity (grams) |
|---|---|---|
| A | Polymethylene polyphenyl isocyanate[1] | 174.3 |
| B | Sucrose amine polyol[2] | 123.6 |
| C | Diethyl bis(2-hydroxyethyl) aminomethyl phosphonate[3] | 13.7 |
| D | $CFCl_3$ | 62.6 |
| E | Surfactant (See Table VIII below) | 2.0 |
| F | N,N—dimethylcyclohexylamine[4] | 2.0 |
| G | Tin mercaptide[5] | 2.4 |

[1]Item A is that used in Formulation 1.
[2]Item B is that supplied by the Mobay Chemical Corporation under the trade name Multranol E9221.
[3]Item C is a flame retardant supplied by the Stauffer Chemical Corporation under the trade name Fyrol 6.
[4]Item F is that used in Formulation 1.
[5]Item G is that used in Formulation 1.

FORMULATION 3

| Item | Ingredient | Quantity (grams) |
|---|---|---|
| A | Polymethylene polyphenyl isocyanate[1] | 194 |
| B | Sucrose amine polyol[2] | 123.8 |
| C | Brominated polyol[3] | 7.9 |
| D | $CFCl_3$ | 68 |
| E | Surfactant (See Table VIII below) | 1.5 |
| F | N,N—dimethylcyclohexylamine[4] | 0.6 |
| G | Tin catalyst[5] | 0.12 |

[1]Item A is that used in Formulation 1.
[2]Item B is that supplied by the Dow Chemical Company under the trade designation XAS 1618.
[3]Item C is a flame retardant supplied by the Dow Chemical Company under the trade designation XNS 50054.20.
[4]Item F is that used in Formulation 1.
[5]Item G is that supplied by M & T Chemicals Inc. under the trade designation T12.

FORMULATION 4

| Item | Ingredient | Quantity (grams) |
|---|---|---|
| A | Polymethylene polyphenyl isocyanate[1] | 196 |
| B | Sucrose amine polyol[2] | 106.6 |
| C | Halogenated polyol[3] | 24.5 |
| D | $CFCl_3$ | 68.9 |
| E | Surfactant (See Table VIII below) | 2.0 |
| F | Tertiary amine catalyst[4] | 2.0 |
| G | Tin catalyst[5] | 0.17 |

[1]Item A is that used in Formulation 1.
[2]Item B is that supplied by Texaco Inc. under the trade name Thanol R480.
[3]Item C is a flame retardant supplied by Reichhold Chemicals, Inc. under the trade name Polylite 98-122.
[4]Item F is that supplied by Texaco Inc. under the trade name Thancat TB20.
[5]Item G is that used in Formulation 3.

TABLE VII-continued

FORMULATION 5

| Item | Ingredient | Quantity (grams) |
|---|---|---|
| A | Polymethylene polyphenyl isocyanate[1] | 202 |
| B | Sucrose amine polyol[2] | 121.7 |
| C | Diethyl bis(2-hydroxyethyl) aminomethyl phosphonate[3] | 12.5 |
| D | $CFCl_3$ | 65 |
| E | Surfactant (See Table VIII below) | 1.2 |
| F | Water | 0.6 |
| G | Tin catalyst[4] | 0.15 |

[1]Item A is that used in Formulation 1.
[2]Item B is that supplied by the Union Carbide Corporation under the trade name Niax FAF 529.
[3]Item C is that used in Formulation 2.
[4]Item G is that used in Formulation 3.

B. SYNTHESUS IF POLYURETHANE FOAMS

In each foam preparation, a polyol premix of Items B, C and D at 15° C. in the quantities shown for the respective urethane formulation of Table VII was poured into a reaction vessel. Items E, F and G at ambient temperature in the quantities listed for the respective formulation were then added to the vessel, and all ingredients were mixed at 1000 rpm for ca. 10 seconds. Lastly, the listed quantity of Item A at 15° C. was added to the vessel and all ingredients were mixed at 3500 rpm for 15 seconds, and thereafter poured into a box to yield a rigid polyurethane foam.

Various characteristics of the polyurethane foams produced are shown in Table VIII below. The data presented in Table VIII demonstrate the superiority of the inventive surfactant produced from a fumarate diester to the comparative surfactant produced from a maleate diester. Polyurethane foams made with the inventive surfactant have a lower friability, a lower initial K-factor, and a lower k-factor after aging than the polyurethane foams made with the comparative surfactant. The substantial superiority of the inventive surfactant is especially manifested in its capacity to stabilize the foam prepared from Urethane Formulation 5, whereas use of the comparative surfactant in this formulation results in friable foam having a high k-factor.

TABLE VIII

EVALUATION OF SURFACTANTS IN POLYURETHANE FOAMS

| FOAM | SURFACTANT NO. | URETHANE FORMULATION[1] | CREAM TIME (sec) | FIRM TIME (sec) | DENSITY (pcf) | FRIABILITY (% wt. Loss, 10 min) | K-FACTOR[2] AFTER 1 day | 7 days | 14 days | 28 days |
|---|---|---|---|---|---|---|---|---|---|---|
| A | 16 | 1 | 19 | 60 | 1.80 | 7.6 | .124 | .133 | .140 | .145 |
| B | 22 | " | 25 | 70 | 1.81 | 12.1 | .132 | .140 | .149 | .155 |
| C | 16 | 2 | 25 | 63 | 1.80 | 14.9 | .129 | .136 | .142 | .151 |
| D | 22 | " | 25 | 75 | 1.88 | 20.3 | .146 | .153 | .159 | .166 |
| E | 16 | 3 | 40 | 110 | 1.88 | 20.1 | .141 | .149 | .155 | .166 |
| F | 22 | " | 45 | 135 | 1.66 | 20.7 | .150 | .163 | .170 | .176 |
| G | 16 | 4 | 27 | 80 | 1.65 | 11.6 | .131 | .140 | .147 | .152 |
| H | 22 | " | 25 | 65 | 1.74 | 8.7 | .137 | .143 | .149 | .155 |
| I | 16 | 5 | 35 | 105 | 1.77 | 10.2 | .136 | .146 | .153 | .163 |
| J | 22 | " | 32 | 115 | — | — | Coarse Celled | | | |
| K | 22 | " | 40 | 120 | 1.57 | 47.4 | .199 | — | — | — |

[1]Of Table VII.
[2]Units = Btu-in/hr-ft²-°F.

EXAMPLE 10

Preparation of Ethoxylated Castor Oil-Unsaturated Diester Surfactants

This example illustrates the synthesis of uncapped surfactants from ethoxylated castor oil and unsaturated diesters utilizing different methods of adding initiator.

Surfactant No. 23 of Table IX below was prepared from uncapped ethoxylated castor oil and ditridecyl maleate (≧95% pure) in an analogous manner to Surfactant No. 1 of Example 1 utilizing the selfsame method of charging the entire amount of initiator to the reaction vessel at the start of the surfactant preparation.

In the preparation of each of Surfactant Nos. 24 and 25 of Table IX below, 200 g of ethoxylated castor oil (Flow Mo 36C) and 50 g of ditridecyl maleate (≧95% pure) were added to a 500 ml vessel equipped with an overhead stirrer. An argon stream was provided through the vessel. The mixture was then heated to 110° C. and maintained with stirring at this temperature while the initiator 1,1-bis(t-butylperoxy)cyclohexane in the amount shown in Table IX was added dropwise to the vessel over a 4 hr period. After completion of the initiator addition, the reaction mixture was heated at 110° C. for an additional 2 hours to yield a viscous liquid surfactant.

The residual diester monomer level and viscosity of the surfactants produced are shown in the following Table IX. Comparative data for an inventive surfactant produced from ditridecyl fumarate (Surfactant No. 16 of Example 7) are included in the table. The Table IX results show that dropwise addition of increased levels of initiator to the reaction mixture containing the maleate diester reduces the amount of residual monomer, thus bringing about an increase in the amount of maleate diester grafted to the polyoxyalkylene adduct. Unfortunately, this improvement in grafting efficiency is accompanied by an undesirable increase in the viscosity of the surfactant.

Table IX clearly reveals important advantages resulting from use of a fumarate diester in producing the surfactant of the present invention. Use of the fumarate diester results in total grafting of the diester to the polyoxyalkylene adduct with less than half the initiator employed in grafting the maleate diester and without the need to resort to the burdensome dropwise addition of initiator used in grafting the maleate diester. Further, because grafting of the fumarate diester does not require increased levels of initiator to enhance grafting efficiency, the viscosity increase which accompanies these high levels in the case of surfactants made from maleate diester is avoided, and the resultant surfactant of the invention instead has an advantageously low viscosity.

selected from the group consisting of unsaturated organic carboxylic acids and unsaturated hydroxyl containing triglycerides with (b) at least one esterified unsaturated dibasic acid having the formula $$T^1O_2C-C_uH_{2u-2}-CO_2T^2$$

wherein u is 2 or 3, $T^1$ and $T^2$ are identical or different and represent a straight or branched, saturated or unsaturated hydrocarbon chain of 8 to 18 carbon atoms, and unsaturated diester reactant (b) includes an amount of fumarate diester effective to bring about grafting of greater than 75 percent by weight of unsaturated diester reactant (b) to the unsaturated polyoxyalkylene adduct, in the presence of an effective amount of a free-radical initiator, and wherein, in the case of the foam material produced from polyisocyanurate polymer forming reactants, the unsaturated polyoxyalkylene adduct is treated either before or after its reaction with the esterified unsaturated dibasic acid with a capping agent capable of reacting with the hydroxyl groups of said adduct to reduce the hydroxyl number of said adduct to less than 50.

2. The foam material of claim 1 wherein the unsaturated polyoxyalkylene adduct is ethoxylated castor oil and ditridecyl fumarate comprises about 95 to 100 weight percent of the esterified unsaturated dibasic acid.

3. The foam material of claim 1 wherein $T^1$ and $T^2$ are identical.

4. The foam material of claim 3 wherein a fumarate diester comprises about 95 to 100 weight percent of the esterified unsaturated dibasic acid.

5. The foam material of claim 4 wherein the unsaturated polyoxyalkylene adduct is ethoxylated castor oil.

6. The foam material of claim 5 wherein the fumarate diester is a member selected from the group consisting of dioleyl fumarate, dioctyl fumarate and ditridecyl fumarate.

7. The foam material of claim 5 wherein the esterified unsaturated dibasic acid comprises about 5 to about 40 weight percent of the free-radical initiated reaction mixture, and the initiator comprises from about 1 to 30 weight percent, based on the weight of the esterified unsaturated dibasic acid.

8. The foam material of claim 7 wherein the unsaturated polyoxyalkylene adduct is ethoxylated castor oil.

9. The foam material of claim 8 wherein the fumarate diester is ditridecyl fumarate.

10. A laminated structural panel having at least one facing sheet and having a foam material adhering to the facing sheet wherein the foam material comprises the reaction product of claim 1.

TABLE IX

| | EFFECT OF INITIATOR ADDITION METHOD ON SURFACTANT PROPERTIES | | | | |
|---|---|---|---|---|---|
| SURFACTANT NO. | INITIATOR[1] (g) | INITIATOR ADDITION METHOD | REACTION TIME (hrs) | RESIDUAL DIESTER (%)[2] | BROOKFIELD VISCOSITY (cps) |
| 23 | 6.6 | All added at charge | 4 | 6.9 | 2230 |
| 24 | 10.0 | Dropwise over 4 hrs | 6 | 2.9 | 7250 |
| 25 | 11.0 | " | 6 | 2.1 | 11,000 |
| 16 | 3.0 | All added at charge | 4 | 0 | 3770 |

[1]Initiator = 1,1-bis (t-butylperoxy) cyclohexane supplied by Witco Chemical Company under the trade name USP-400P.
[2]Weight percent based on total weight of surfactant, and determined by LC.

I claim:

1. A foam material comprising the reaction product of:
(A.) polymer forming reactants selected from the group consisting of polyurethane and polyisocyanurate polymer forming reactants,
(B.) a blowing agent, and
(C.) a surfactant which comprises the product of a grafting reaction of
(a) an unsaturated polyoxyalkylene adduct comprising an alkylene oxide adduct of a member 11. The laminated structural panel of claim 10 wherein the foam material is reinforced by glass fibers.

12. The laminated structural panel of claim 10 wherein the unsaturated polyoxyalkylene adduct is ethoxylated castor oil and ditridecyl fumarate comprises about 95 to 100 weight percent of the esterified unsaturated dibasic acid.

13. The laminated structural panel of claim 12 wherein the foam material is reinforced by glass fibers.

14. The laminated structural panel of claim 10 wherein $T^1$ and $T^2$ are identical.

15. The laminated structural panel of claim 14 wherein a fumarate diester comprises about 95 to 100 weight percent of the esterified unsaturated dibasic acid.

16. The laminated structural panel of claim 15 wherein the unsaturated polyoxalkylene adduct is ethoxylated castor oil.

17. The laminated structural panel of claim 11 wherein $T^1$ and $T^2$ are identical.

18. The laminated structural panel of claim 17 wherein a fumarate diester comprises about 95 to 100 weight percent of the esterified unsaturated dibasic acid.

19. The laminated structural panel of claim 18 wherein the unsaturated polyoxyalkylene adduct is ethoxylated castor oil.

* * * * *